US00RE49183E

(19) United States
(12) Reissued Patent
Huang et al.

(10) Patent Number: US RE49,183 E
(45) Date of Reissued Patent: Aug. 23, 2022

(54) LAMP SOCKET ADAPTER

(71) Applicants: Tanghe Yaohao Electronics Co., Ltd., Henan Province (CN); Dongguan Yaohao Intelligent Technology Co., Ltd., Dongguan (CN); Sheng-Hsin Liao, New Taipei (TW)

(72) Inventors: Li-jian Huang, Xiangyang (CN); Sheng-Hsin Liao, New Taipei (TW)

(73) Assignees: Tanghe Yaohao Electronics Co., Ltd., Henan Province (CN); Dongguan Yaohao Intelligent Technology Co., Ltd., Dongguan (CN); Sheng-Hsin Liao, New Taipei (TW)

(21) Appl. No.: 16/453,207

(22) Filed: Jun. 26, 2019

Related U.S. Patent Documents

Reissue of:
(64) Patent No.: 10,141,701
Issued: Nov. 27, 2018
Appl. No.: 15/688,947
Filed: Aug. 29, 2017

(30) Foreign Application Priority Data

Nov. 1, 2016 (CN) ..... 201621215287.0

(51) Int. Cl.
*H01R 33/46* (2006.01)
*H01R 33/22* (2006.01)
*H01R 31/06* (2006.01)
*H01R 33/88* (2006.01)

(52) U.S. Cl.
CPC ..... *H01R 33/46* (2013.01); *H01R 31/06* (2013.01); *H01R 33/22* (2013.01); *H01R 33/88* (2013.01)

(58) Field of Classification Search
CPC ..... H01R 31/06; H01R 33/46; H01R 33/88; H01R 33/22
See application file for complete search history.

(56) References Cited

U.S. PATENT DOCUMENTS 1,490,730 A * 4/1924 Both ..... H01R 33/94 439/646
1,504,655 A * 8/1924 Thompson ..... H01R 33/94 439/646
1,587,165 A * 6/1926 McClatchie ..... H01R 33/94 439/646

(Continued)

FOREIGN PATENT DOCUMENTS

WO WO 2007/084049 A1 * 7/2007 ..... H01R 33/22

*Primary Examiner* — Sara S Clarke
(74) *Attorney, Agent, or Firm* — Li & Cai Intellectual Property (USA) Office

(57) ABSTRACT

A lamp socket adapter includes a main body, a sleeve disposed outside of the main body, and a center electrode disposed at the rear end of the main body, in which a front end of the main body is provided with an insulating plug, the insulating plug has a through hole, the through hole is connected to a cavity of the main body, a first electrode sheet and a second electrode sheet each having a front end disposed in the through hole are arranged in the cavity, the rear end of the first electrode sheet is electrically connected to the center electrode, and the rear end of the second electrode sheet is electrically connected to the sleeve. Therefore, the lamp socket adapter of the present disclosure has the advantages of saving material costs, compact structure, and facilitating the fixing, mounting and replacement of a lamp bulb.

11 Claims, 7 Drawing Sheets

(56) References Cited

U.S. PATENT DOCUMENTS

| | | | | | |
|---|---|---|---|---|---|
| 1,988,489 | A * | 1/1935 | Gunthorp | H01R 33/94 | 439/374 |
| 2,073,378 | A * | 3/1937 | Olson | H01R 33/94 | 439/646 |
| 2,087,538 | A * | 7/1937 | Godare | H01R 13/15 | 439/646 |
| 2,246,209 | A * | 6/1941 | Johnson | H01R 33/94 | 439/646 |
| 3,977,746 | A * | 8/1976 | Seibold | H01R 33/94 | 439/639 |
| 4,688,874 | A * | 8/1987 | Bjorkman | H01J 61/56 | 315/51 |
| 5,320,548 | A * | 6/1994 | Schadhauser | H01R 33/0809 | 313/318.04 |
| 5,545,950 | A * | 8/1996 | Cho | H01J 5/48 | 313/318.01 |
| 5,569,981 | A * | 10/1996 | Cho | H01J 61/327 | 313/318.04 |
| 5,634,820 | A * | 6/1997 | Vakil | F21S 8/00 | 313/318.01 |
| 10,116,109 | B1 * | 10/2018 | Peng | H01R 31/06 | |
| 10,193,289 | B1 * | 1/2019 | Peng | H01R 33/22 | |

* cited by examiner (Amended)

LAMP SOCKET ADAPTER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

1. Field of the Invention

The present disclosure relates to the technical field of a lamp socket adapter.

2. Description of Related Art

Referring to FIG. 1, a conventional lamp electrical connection device includes an electrical connector 30, an electrical wire 31 and a lamp cap 32. The lamp cap 32 is used for connecting with a lamp socket to realize the electrical communication with the electrical network. The electrical connector 30 is used for connecting with a lamp bulb that cannot match the lamp socket. The electrical wire 31 is used for the electrical connection between the electrical connector 30 and the lamp cap 32.

The conventional lamp electrical connection device has the drawbacks that since the electrical wire 31 is flexible, the lamp bulb is in a freely movable state when the lamp bulb is mounted on the electrical connector 30, and the position of the lamp bulb is easily shifted when an external force is applied thereon. The lamp bulb cannot be fixed, and is susceptible to being pulled, thereby resulting in a poor electrical connection. In addition, the electrical wire 31 occupies a larger volume after being stretched, and the usage amount of copper wire and insulating material is large.

In this regard, the present disclosure provides a lamp socket adapter to overcome the aforementioned drawbacks.

SUMMARY OF THE INVENTION

The object of the present disclosure is to provide a lamp socket adapter having an integral structure with an electrical connector and a main body of a lamp bulb, which is capable of fixing the lamp bulb, realizing electrical connection, saving material, and having a simple structure.

In order to achieve the object of the present disclosure, the lamp socket adapter includes a main body, a sleeve disposed outside of the main body, and a center electrode disposed at a rear end of the main body, in which a front end of the main body is provided with an insulating plug, the insulating plug has a through hole, the through hole is in air communication with a cavity of the main body, a first electrode sheet and a second electrode sheet each having a front end disposed in the through hole are arranged in the cavity, a rear end of the first electrode sheet is electrically connected to the center electrode, and a rear end of the second electrode sheet is electrically connected to the sleeve.

The outer surface of the main body is provided with a threaded conductive metal sleeve which can be made to fit various screw lamp caps so as to be mounted on the corresponding screw lamp socket. The front end of the main body is provided with an insulating plug so that when the lamp socket adapter is mounted on the lamp socket, the risk of electric shock caused by the human body being in contact with an end of the plug can be avoided. When the receptacle of the lamp bulb is connected to the insulating plug, the receptacle of the lamp bulb is sleeved on the insulating plug so that the lamp bulb is fixed. In addition, the corresponding electrode plug of the lamp bulb extends into the through hole and is in contact with the first electrode sheet and the second electrode sheet to realize the electrical connection. Therefore, the lamp bulb can be connected to the lamp socket adapter more tightly through the internal and external plug connection. In particular, the LED can be directly fixed onto the lamp socket adapter so that the installation and the replacement can be simpler.

For further understanding of the present disclosure, the following embodiments are provided along with illustrations to facilitate the disclosure of the present disclosure.

DETAILED DESCRIPTION OF PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings. In addition, for an easy instruction, similar reference numbers or symbols refer to elements alike.

Hereinafter, five specific embodiments of the lamp socket adapter according to the present disclosure will be described in more detail with reference to the accompanying drawings.

[First Embodiment]

Figure 1:
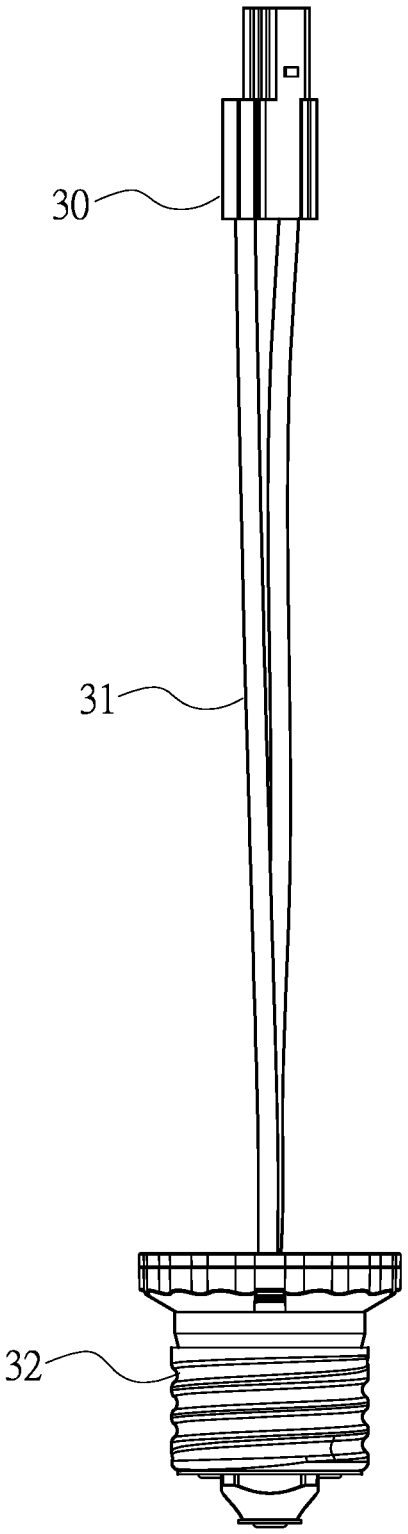
FIG. 1 RELATED ART
FIG. 1 is a schematic view showing a conventional lamp electrical connection device.
Figure 2:
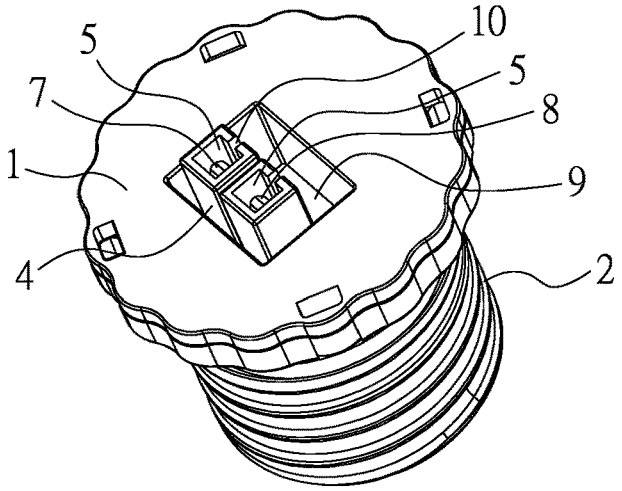
FIG. 2 is a perspective view showing a lamp socket adapter of the present disclosure.
Figure 3:
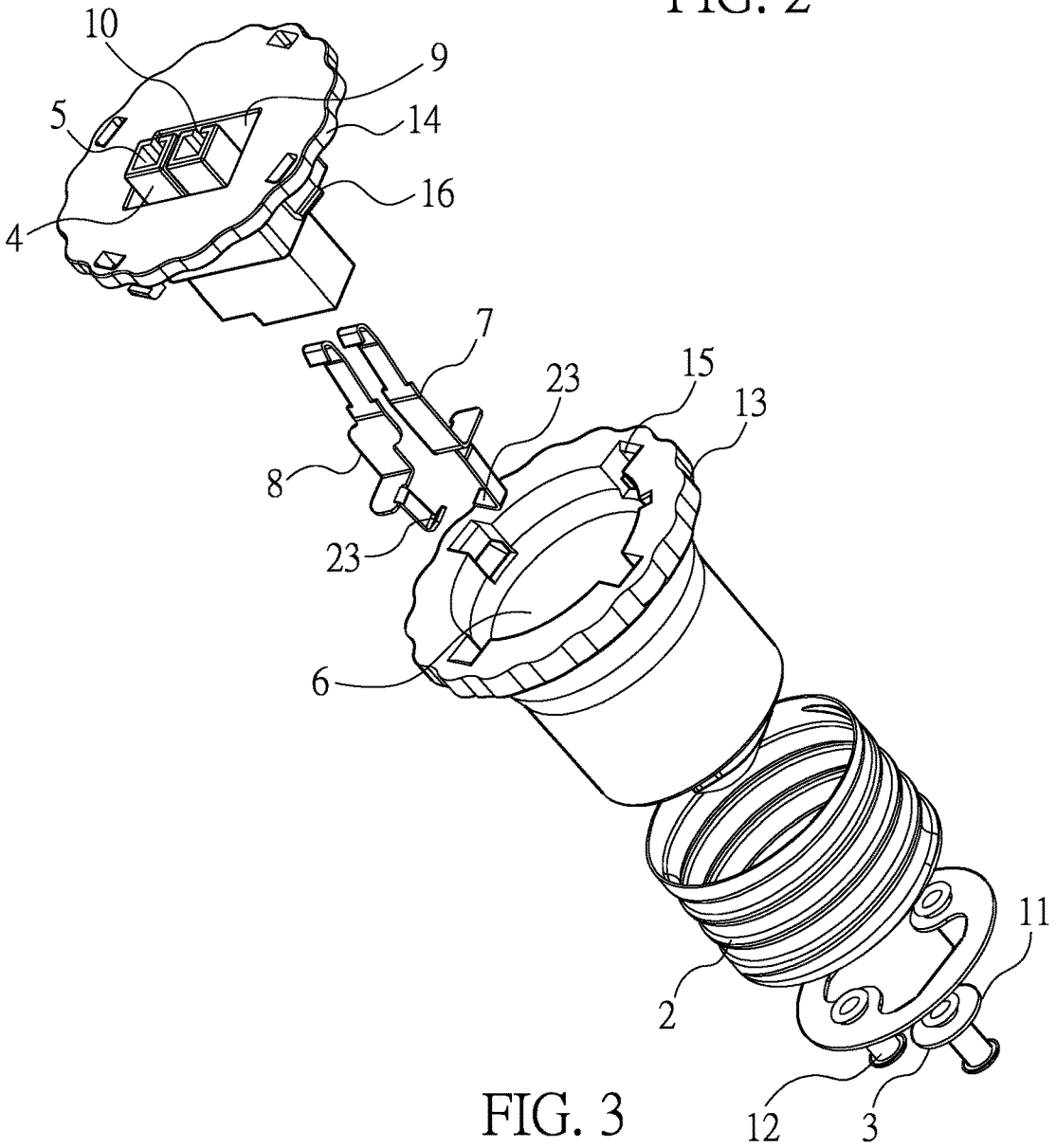
FIG. 3 is an exploded view showing the lamp socket adapter according to a first embodiment of the present disclosure.

Referring to FIG. 2 and FIG. 3, the lamp socket adapter of the present disclosure includes a main body 1 made of plastic, and a sleeve 2 sleeved on the outside of the main body 1, in which the sleeve 2 is fastened to a cylindrical surface of the main body 1. The sleeve 2 is stamped from a metal sheet and has a cylindrical shape. The wall of the sleeve 2 is of a threaded shape and can be screwed with a lamp socket. A rear end of the main body 1 is provided with a center electrode 3 which is reachable to an electrode of the lamp socket. A front end of the main body 1 is provided with two insulating plugs 4 arranged side by side, and the insulating plugs 4 can be plugged into the corresponding receptacle for electrical connection. Each of the insulating plugs 4 has a square-shaped through hole 5, and the through holes 5 are in air communication with a cavity 6 of the main body 1. A first electrode sheet 7 and a second electrode sheet 8 each having a front end disposed in the through hole 5 are arranged in the cavity 6. A rear end of the first electrode sheet 7 is electrically connected to the center electrode 3, and a rear end of the second electrode sheet 8 is electrically connected to the sleeve 2. The two insulating plugs 4 can enhance the dielectric strength between the first electrode sheet 7 and the second electrode sheet 8, and can facilitate the insertion of the first electrode sheet 7 and the second electrode sheet 8 into the corresponding square-shaped through holes 5, respectively. In practical applications, the lamp socket adapter is screwed and fixed to the lamp socket so that the lamp socket adapter cannot be moved and the receptacle can be easily plugged with the lamp socket adapter. When the receptacle is plugged with the insulating plugs 4, voltages of a live wire and a neutral wire are conducted to the first electrode sheet 7 and the second electrode sheet 8.

The main body 1 is made of plastic and has a hollow cavity 6 formed therein, thereby facilitating the manufacture of the main body 1 and saving material costs. The sleeve 2 is made of a conductive metal (i.e. copper), and the thread of the sleeve 2 is made to fit various lamp caps so as to be screwed with the corresponding lamp socket. The first electrode sheet 7 and the second electrode sheet 8 are stamped from copper sheets and have a certain elastic force. The first electrode sheet 7 and the second electrode sheet 8 are respectively fixed in the main body 1, the front ends thereof are respectively fixed in the corresponding through holes 5, and the rear ends thereof are respectively fixed to the center electrode 3 and the sleeve 2. Accordingly, the voltages of the live wire and the neutral wire are respectively conducted to the first electrode sheet 7 and the second electrode sheet 8 via the center electrode 3 and the sleeve 2. The usage amount of copper in the conductive structure of the present disclosure is particularly small, but the overall conductive cross-sectional area is particularly large. That is, the cross-sectional of the electrode sheet made of copper achieves the overcurrent that can withstand to the maximum extent practicable. In addition, the structure of the device is compact, and the insertion of the device is simple and convenient.

The main body 1 includes a rear base 13 and an end cap 14. The sleeve 2 is disposed on the rear base 13. The insulating plug 4 is disposed on the end cap 14. The rear base 13 has an engaging slot 15. The end cap 14 has a holding hook 16. The holding hook 16 is hooked into the engaging slot 15 so that the end cap 14 is engaged with the rear base 13. Each of the first electrode sheet 7 and the second electrode sheet 8 has a curved hook 23. A center rivet (11) and a barrel rivet (12) are respectively riveted on the main body 1. The curved hooks 23 of the two electrode sheets are respectively and elastically abutted against the insides of the center rivet 11 and the barrel rivet 12. When the rear base 13 and the end cap 14 are engaged together, the first electrode sheet 7 and the second electrode sheet 8 are appropriately bent in the cavity 6 of the main body 1 so that the rear ends thereof are respectively and elastically abutted against the center electrode 3 and the sleeve 2 to realize electrical connection.

Figure 4:
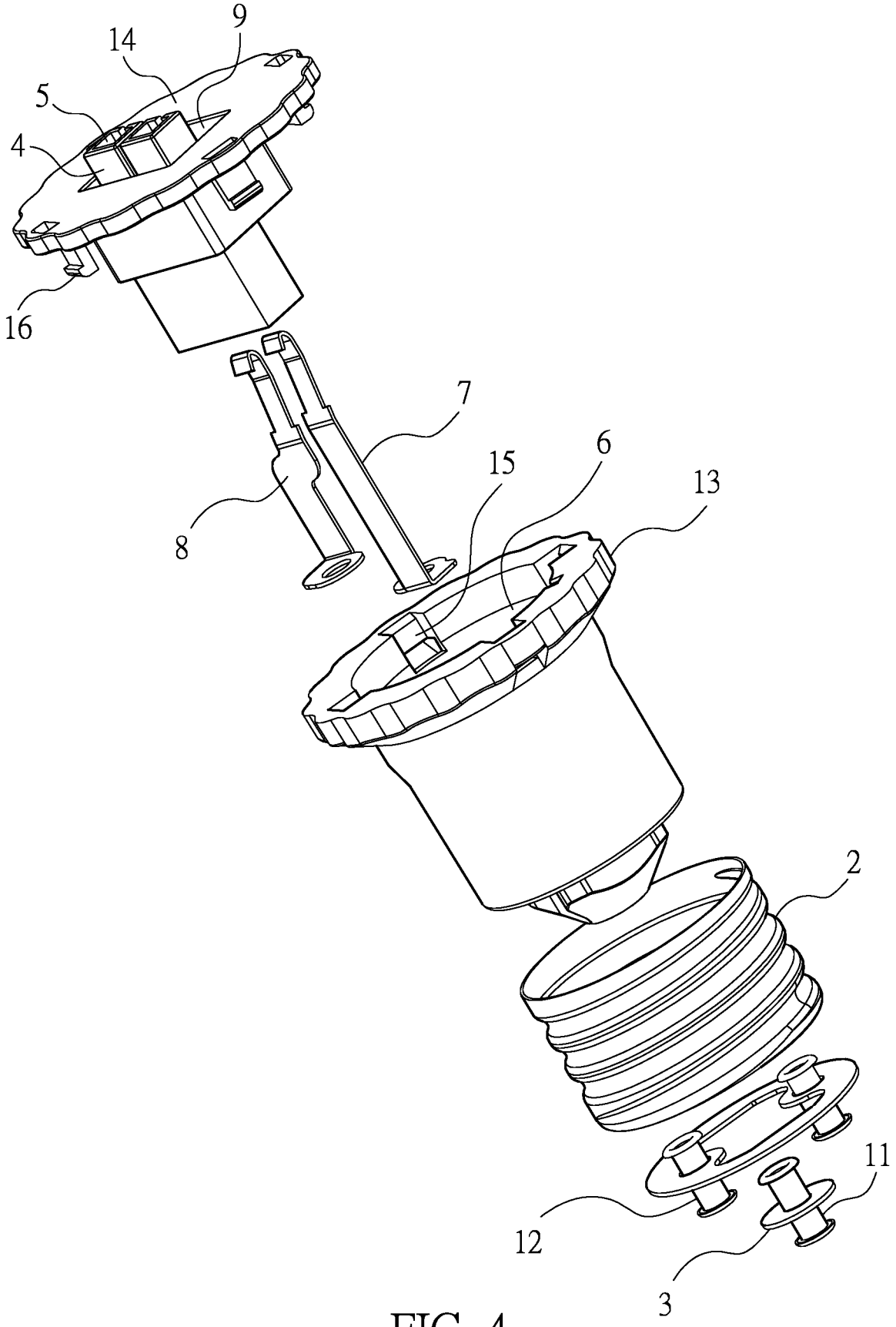
FIG. 4 is an exploded view showing the lamp socket adapter according to a second embodiment of the present disclosure.
Figure 5:
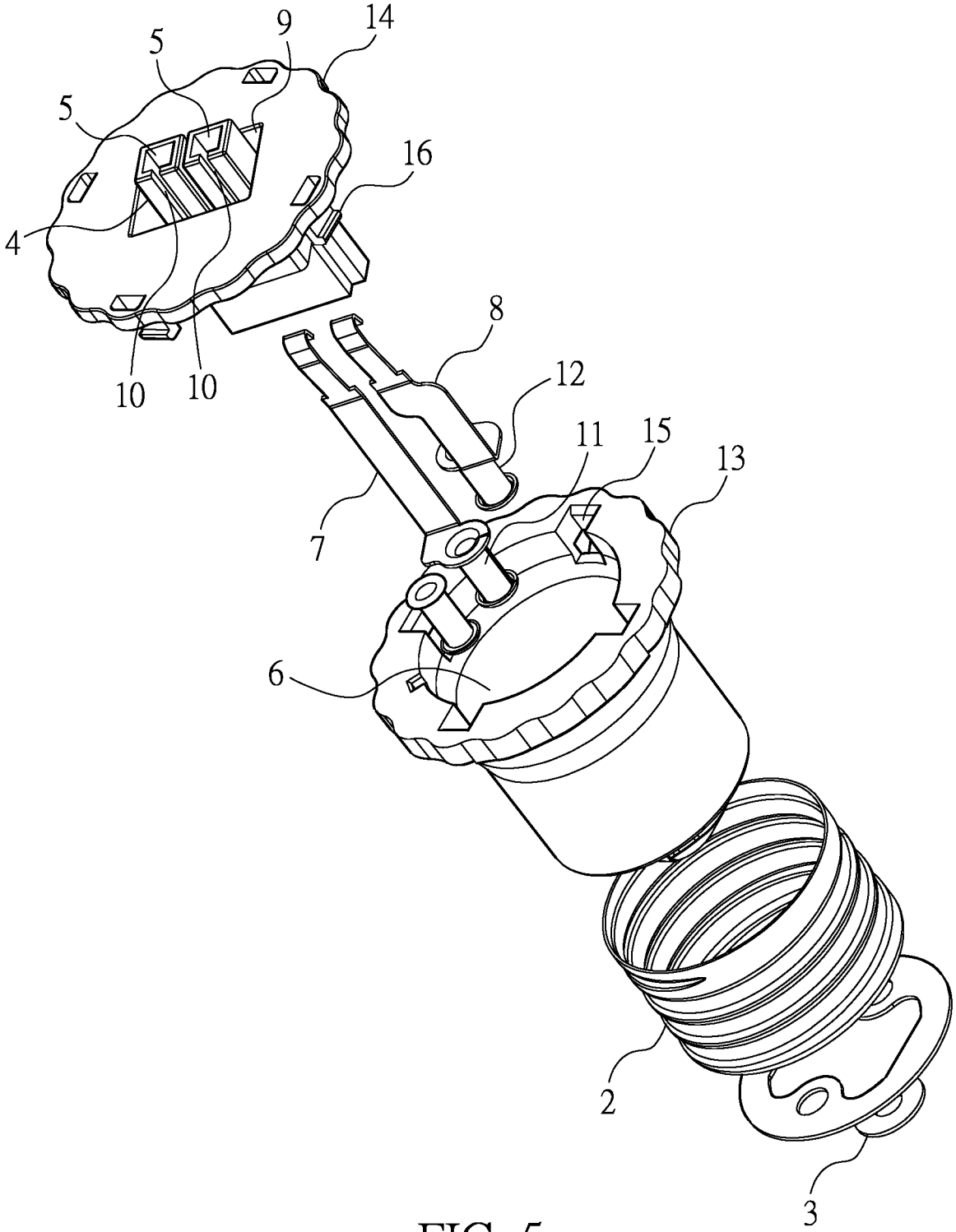
FIG. 5 is an exploded view showing the lamp socket adapter according to a third embodiment of the present disclosure.

Referring to FIG. 3, FIG. 4 and FIG. 5, the front end of the main body 1 has a recessed groove 9 which is recessed toward the cavity 6. The insulating plug 4 is arranged in the recessed groove 9. An annular groove capable of accommodating the receptacle is formed between the periphery of the insulating plug 4 and the inner wall of the recessed groove 9. The arrangement of the recessed groove 9, on the one hand, allows the insulating plug 4 to be retracted into the main body 1 so that the exposed portion of the insulating plug 4 is shortened and the structure thereof becomes more compact. On the other hand, the inner wall of the recessed groove 9 and the outer surface of the insulating plug 4 are configured to hold the receptacle plugged therewith so that the lamp socket adapter is securely plugged into the receptacle and is not easily loosened. Since the insulating plug 4 approaches a rear end of the sleeve 2 and the center electrode 3, the lengths of the first electrode sheet 7 and the second electrode sheet 8 can be shortened. Accordingly, the usage amount of copper can be saved and the manufacturing cost can be reduced.

The insulating plug 4 has a notch 10 capable of receiving the conductor (i.e. electrode) of the receptacle. The arrangement of the notch 10 allows the conductor of the receptacle to insert into the square-shaped through holes 5 from the side edge of the insulating plug 4 and to contact the first electrode sheet 7 and the second electrode sheet 8 to realize electrical connection.

[Second Embodiment]

Referring to FIG. 2 and FIG. 4, the rear base 13 is provided with a center rivet 11. The center electrode 3 and the first electrode sheet 7 are riveted on a rear end of the rear base 13 via the center rivet 11. The center rivet 11 not only can fix the first electrode sheet 7 to the main body 1, but also can allow the center electrode 3 to be electrically connected to the first electrode sheet 7. Moreover, the electrical connection realized in this way can withstand higher current than that realized by welding or plugging can.

The rear base 13 is provided with two barrel rivets 12 riveted on the rear end of the sleeve 2. The sleeve 2 and the second electrode sheet 8 are riveted on the rear end of the rear base 13 via one of the barrel rivets 12. The barrel rivets 12 not only can fix the second electrode sheet 8 to the main body 1, but also can allow the barrel rivets 12 to be electrically connected to the second electrode sheet 8. Moreover, the electrical connection realized in this way can withstand higher current than that realized by welding or plugging can.

[Third Embodiment]

Referring to FIG. 2 and FIG. 5, the center rivet 11 is a C-shaped tubular structure formed by bending a portion of the first electrode sheet 7 and is integrated with the first electrode sheet 7. The center rivet 11 is stamped from a copper strip. More specifically, the center rivet 11 is formed by folding a segment of a rear end of the copper strip; crimping the segment upward to form a tubular body; inserting the tubular body into a riveting hole of the main body 1; and forming an electrode after riveting.

The barrel rivet 12 is disposed on the rear end of the second electrode sheet 8. The barrel rivet 12 is a C-shaped tubular structure formed by bending a portion of the second electrode sheet and is integrated with the second electrode sheet. Similar to the center rivet 11 described above, the barrel rivet 12 is also stamped from a copper strip. More specifically, the barrel rivet 12 is formed by folding a segment of the rear end of the copper strip; crimping the segment upward to form a tubular body; inserting the tubular body into the corresponding riveting hole of the main body 1; and electrically connecting the barrel rivet 12 to the second electrode sheet 8 after riveting. The tubular body not only has the riveting function that allows the first electrode sheet 7 and the second electrode sheet 8 to be fixed to the main body 1, but also realizes the direct electrical connection so that the electrical contact point on the electrical connection path can be omitted. Accordingly, the electrical connection realized in this way is more reliable than riveting of individual rivets and electrode sheets is.

The assembling steps include: riveting the first electrode sheet 7 and the second electrode sheet 8 to the sleeve 2 and the center electrode 3 disposed on the rear base 13, respectively; inserting the first electrode sheet 7 and the second electrode sheet 8 into the through holes 5 of the insulating plugs 4, respectively; and engaging the end cap 14 with the rear base 13.

[Fourth Embodiment]

Figure 6:
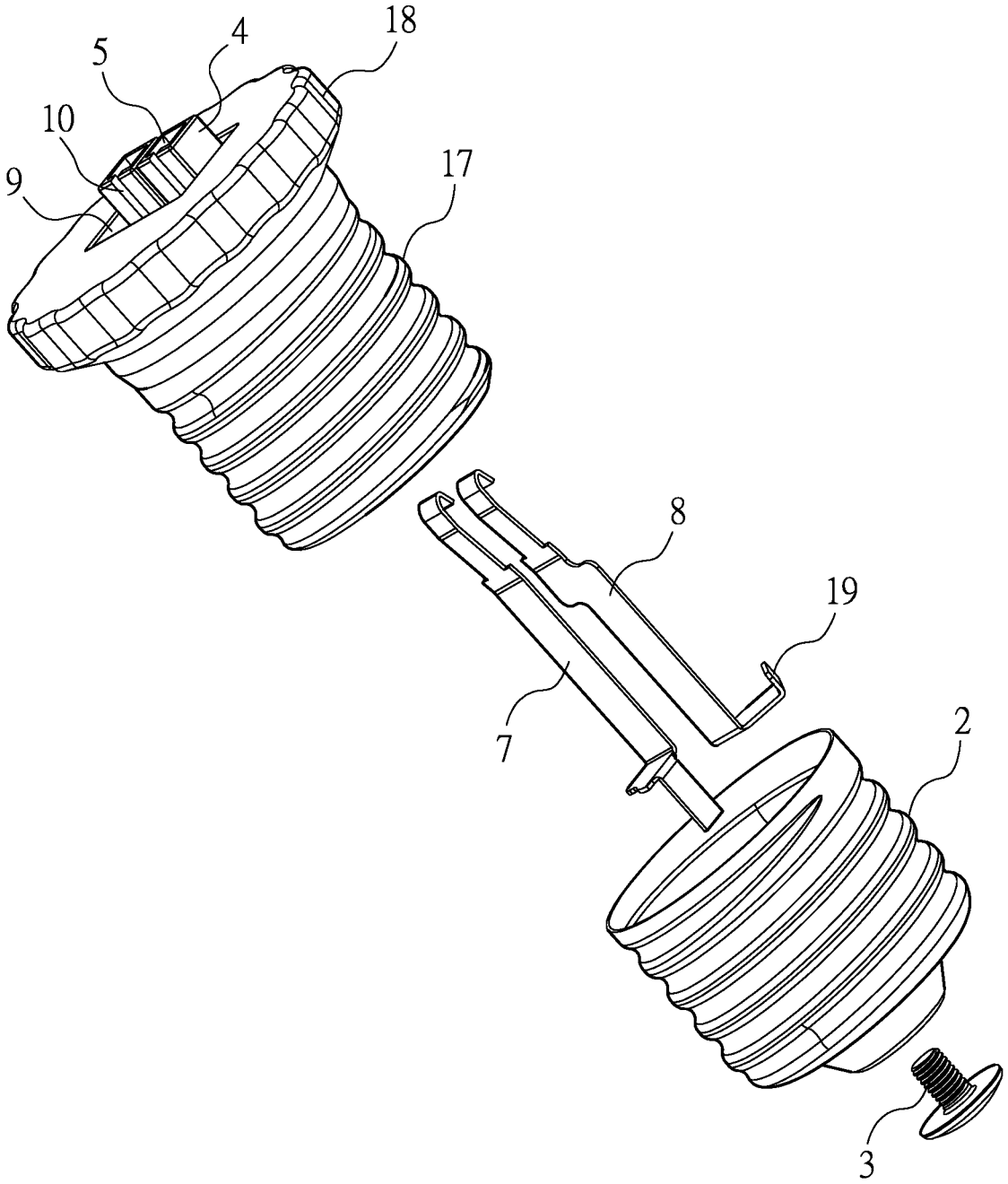
FIG. 6 is an exploded view showing the lamp socket adapter according to a fourth embodiment of the present disclosure.
Figure 7:
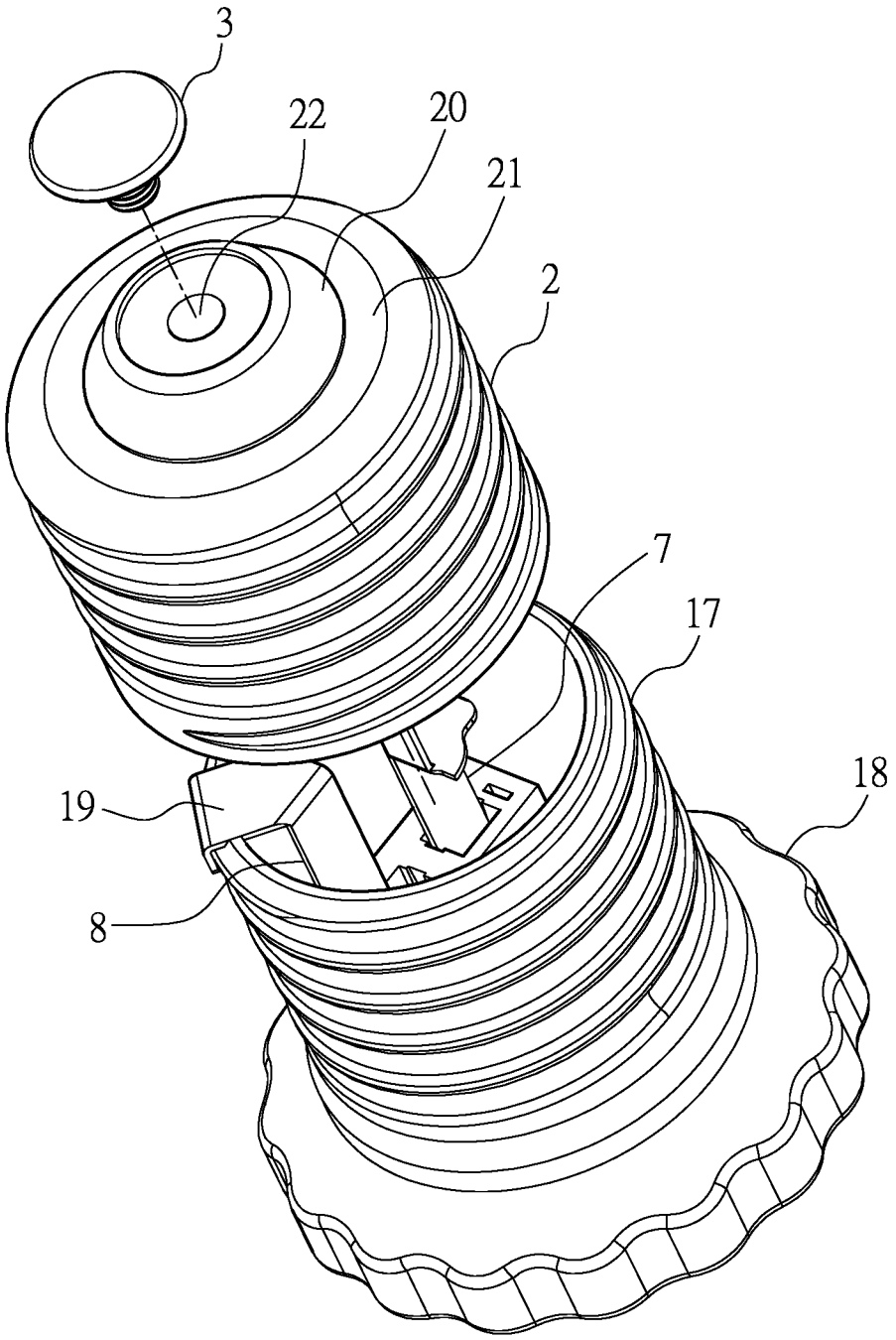
FIG. 7 is an exploded view showing another viewing angle of FIG. 6.

Referring to FIG. 2, FIG. 6 and FIG. 7, the main body 1 includes a tubular body 17. A front end of the tubular body 17 has an end surface 18. The tubular body 17 and the end surface 18 are integrally formed with each other. The sleeve 2 is sleeved on the tubular body 17. The insulating plug 4 is disposed on the end surface 18. The rear end of the second electrode sheet 8 has a bent portion 19 hooked into a rear end of the tubular body 17. The bent portion 19 is sandwiched between the sleeve 2 and the tubular body 17. The bent portion 19 is electrically contacted with the sleeve 2. A middle portion of the sleeve 2 includes an insulating ring 20. The rear end of the first electrode sheet 7 is fixed to a center hole 22 of the insulating ring 20. The assembling steps include: inserting the first electrode sheet 7 and the second electrode sheet 8 into the through holes 5 of the insulating plugs 4; hooking the bent portion 19 of the rear end of the second electrode sheet 8 to the rear end of the tubular body 17; disposing the rear end of the first electrode sheet 7 in the center hole 22 of the insulating ring 20; and screwing the threaded sleeve 2 onto the threaded tubular body 17 so that the bent portion 19 is clamped and fixed between the sleeve 2 and the tubular body 17, and can be electrically connected to the sleeve 2. The assembly of this structure is simple and fast.

The rear end of the sleeve 2 has a surrounding surface 21. The insulating ring 20 is clamped and fixed to the inner side of the surrounding surface 21. The center electrode 3 is a self-tapping screw screwed into the center hole 22. The insulating ring 20 is an injection molded plastic member on the surrounding surface 21 of the sleeve 2, and has insulating properties and a certain plasticity. When the self-tapping screw is screwed into the circular center hole 22, the rear end of the first electrode sheet 7 becomes curve-shaped and is clamped and fixed to the wall of the circular center hole 22. Moreover, the self-tapping screw enables the wall of the circular center hole 22 to be formed with the corresponding threads so that the center electrode 3 can be securely fixed to the main body 1 and is not easily loosened while the first electrode sheet 7 can be electrically connected to the center electrode 3.

[Fifth Embodiment]

Figure 8:
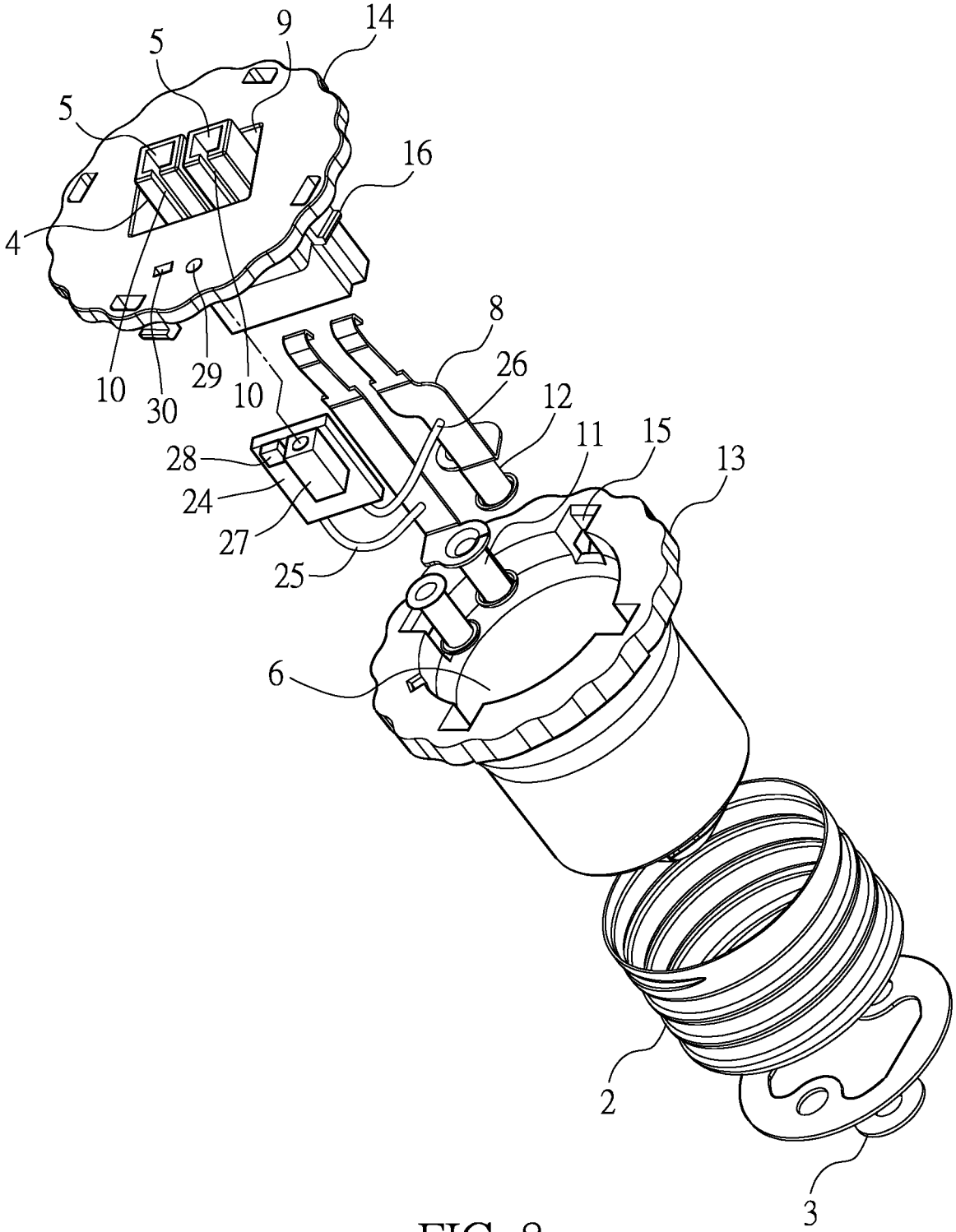
FIG. 8 is an exploded view showing the lamp socket adapter according to a fifth embodiment of the present disclosure.

Referring to FIG. 2 and FIG. 8, the front end of the main body 1 is provided with an electrical connector 27, and the electrical connector 27 can be plugged into the corresponding connector for electrical connection. The inside of the cavity 6 of the main body 1 is provided with a circuit board 24. The electrical connector 27 is electrically connected to the circuit board 24, and the circuit board 24 is respectively and electrically connected to the first electrode sheet 7 and the second electrode sheet 8 via wires 25, 26 so that the power of the first electrode sheet 7 and the second electrode sheet 8 can be transmitted to the circuit board 24 via the wires 25, 26. The electrical connector 27 can be various types of electrical connectors such as a USB connector, an IEEE1394 connector, a HDMI connector, an AV terminal or a DC terminal. In the present embodiment, the electrical connector 27 is a DC terminal. The end cap 14 of the main body 1 has an opening 29 corresponding in position to the electrical connector 27 so that a portion of the electrical connector 27 is exposed and can be plugged with the corresponding connector. The circuit board 24 is electrically connected to an electronic device 28. The electronic device 28 can be a transformer, a night light, a wireless charger, an emergency lighting, a wireless controller, a wireless AP, a wireless module, a timer, a ground fault circuit interrupter, a hub, a sensor, a mobile detector, a battery or other devices. The end cap 14 of the main body 1 has a perforation 30 corresponding in position to the electronic device 28.

In view of the above, the lamp socket adapter of the present disclosure omits the electrical wire in the prior art. Therefore, the material costs can be greatly saved, and the structure of the lamp socket adapter can be made more compact. Moreover, the lamp socket adapter of the present disclosure facilitates the fixing, mounting and replacement of a lamp bulb, and makes the electrical connection more secure and reliable. In particular, a LED bulb, due to its light weight characteristic, can be directly installed, plugged and fixed to the lamp socket adapter, and is not easily loosened.

The descriptions illustrated supra set fifth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A lamp socket adapter, comprising:

a main body;

a sleeve disposed outside of the main body; and a center electrode disposed at a rear end of the main body;

wherein a front end of the main body is provided with an insulating plug, the insulating plug has a through hole, the through hole is in air communication with a cavity of the main body, a first electrode sheet and a second electrode sheet each having a front end disposed in the through hole are arranged in the cavity, a rear end of the first electrode sheet is electrically connected to the center electrode, and a rear end of the second electrode sheet is electrically connected to the sleeve; and wherein the front end of the main body has a recessed groove which is recessed toward the cavity, the insulating plug is arranged in the recessed groove, and an annular groove capable of accommodating a receptacle is formed between a periphery of the insulating plug and an inner wall of the recessed groove.

2. The lamp socket adapter according to claim 1, wherein the main body includes a rear base and an end cap, the sleeve is disposed on the rear base, the insulating plug is disposed on the end cap, the rear base has an engaging slot, the end cap has a holding hook, and the holding hook is hooked into the engaging slot so that the end cap is engaged with the rear base.

3. The lamp socket adapter according to claim 2, wherein the rear base is provided with a center rivet and a barrel rivet, the center electrode and the first electrode sheet are riveted on a rear end of the rear base via the center rivet, and the sleeve and the second electrode sheet are riveted on the rear end of the rear base via the barrel rivet.

4. The lamp socket adapter according to claim 3, wherein the center rivet is a C-shaped tubular structure formed by bending a portion of the first electrode sheet and is integrated with the first electrode sheet, wherein the barrel rivet is disposed on the rear end of the second electrode sheet, and the barrel rivet is a C-shaped tubular structure formed by bending a portion of the second electrode sheet and is integrated with the second electrode sheet.

5. The lamp socket adapter according to claim 1, wherein the rear ends of the first electrode sheet and the second electrode sheet are respectively and elastically abutted against the center electrode and the sleeve.

6. The lamp socket adapter according to claim 5, wherein each of the first electrode sheet and the second electrode sheet has a curved hook, a center rivet and a barrel rivet are respectively riveted on the main body, and the curved hooks of the first electrode sheet and the second electrode sheet are respectively and elastically abutted against the insides of the center rivet and the barrel rivet.

7. The lamp socket adapter according to claim 1, wherein the main body includes a tubular body, a front end of the tubular body has an end surface, the tubular body and the end surface are integrally formed with each other, the sleeve is sleeved on the tubular body, the insulating plug is disposed on the end surface, the rear end of the second electrode sheet has a bent portion hooked into a rear end of the tubular body, the bent portion is sandwiched between the sleeve and the tubular body, the bent portion is electrically contacted with the sleeve, a middle portion of the sleeve includes an insulating ring, and the rear end of the first electrode sheet is fixed to a center hole of the insulating ring.

8. The lamp socket adapter according to claim 7, wherein the rear end of the sleeve has a surrounding surface, the insulating ring is clamped to the inner side of the surrounding surface, and the center electrode is a self-tapping screw screwed into the center hole.

9. The lamp socket adapter according to claim 1, wherein the front end of the main body is provided with an electrical connector, the inside of the cavity of the main body is provided with a circuit board, the electrical connector is electrically connected to the circuit board, and the circuit board is electrically connected to the first electrode sheet and the second electrode sheet.

10. The lamp socket adapter according to claim 9, wherein the electrical connector is a DC terminal.

11. The lamp socket adapter according to claim 9, wherein the circuit board is electrically connected to an electronic device.

* * * * *